Figure 1:
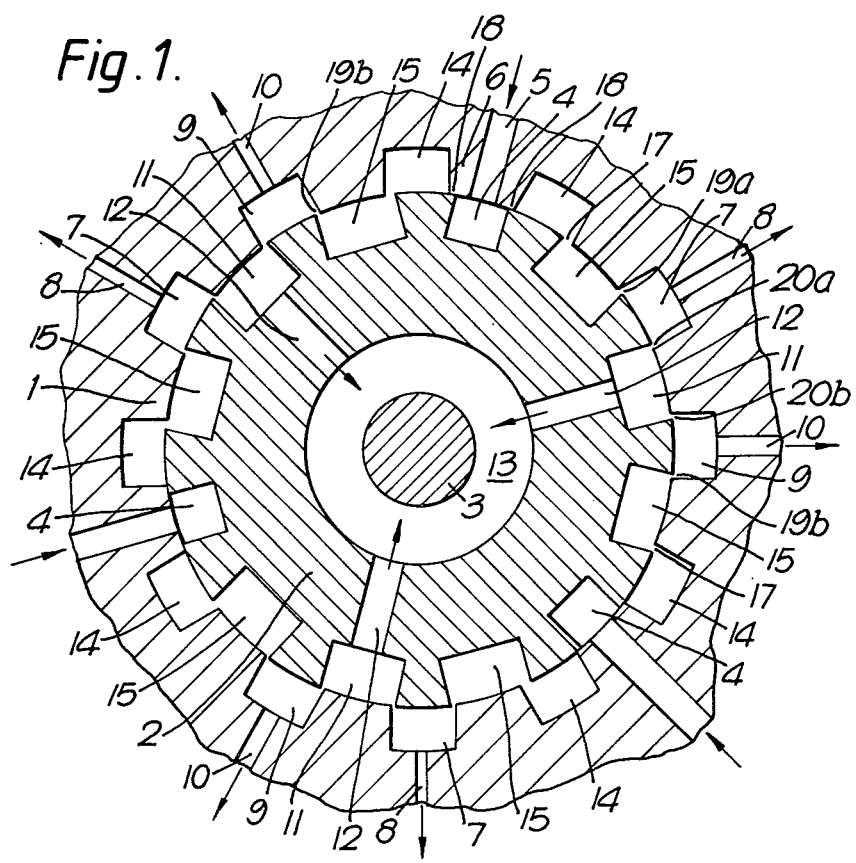

United States Patent [19]

Millard

[11] Patent Number: 4,469,342

[45] Date of Patent: Sep. 4, 1984

[54] ROTARY VALVE FOR A POWER ASSISTED STEERING MECHANISM

[75] Inventor: Barry J. Millard, Reading, England

[73] Assignee: Adwest Engineering Limited, Reading, England

[21] Appl. No.: 454,541

[22] Filed: Dec. 30, 1982

[30] Foreign Application Priority Data

Dec. 31, 1981 [GB] United Kingdom ............... 8139142

[51] Int. Cl.$^3$ ............................................. B62D 5/08
[52] U.S. Cl. ............................... 280/148; 74/388 PS; 137/625.24
[58] Field of Search ............... 180/132, 148, 133; 74/388 PS; 137/625.21, 625.24; 91/375 A

[56] References Cited

U.S. PATENT DOCUMENTS

| | | | |
|---|---|---|---|
| 3,707,167 | 12/1972 | Colletti | 137/625.24 |
| 3,746,045 | 7/1973 | Bunker et al. | 137/625.24 |
| 4,214,642 | 7/1980 | Dauvergne | 180/132 |
| 4,303,099 | 12/1981 | Kervagoret | 137/625.21 |
| 4,311,171 | 1/1982 | Roberts | 137/625.24 |
| 4,353,288 | 10/1982 | Holub | 137/625.24 |

FOREIGN PATENT DOCUMENTS 1308992  3/1973  United Kingdom .

*Primary Examiner*—Joseph F. Peters, Jr.
*Assistant Examiner*—Kenneth R. Rice
*Attorney, Agent, or Firm*—Bruns and Wall

[57] ABSTRACT

The invention provides a closed center rotary valve and a power-assisted steering mechanism for a motor vehicle incorporating the rotary valve.

The closed center rotary valve comprises cooperating relatively rotatable sleeve and core members having cooperating axially-extending grooves therein and means relatively biassing the members towards a neutral position.

Said grooves comprise at least one inlet groove connectable to a source of fluid under pressure, a cylinder groove angularly spaced from the inlet groove on each side thereof and connectable to opposite sides of a double-acting piston-and-cylinder, and a return groove in overlapping relation with each of the cylinder grooves in the neutral position of the valve and connectable to a reservoir for the fluid under pressure, the inlet groove being closed from communication with the cylinder and return grooves in the neutral position of the valve. The arrangement is such that on relative angular displacement of the member in either direction from the neutral position the inlet groove is placed in communication with one of the cylinder grooves, the one cylinder groove and its associated return groove move out of their overlapping relation to close communication therebetween, and the overlap between the other cylinder groove and its associated return groove is increased.

10 Claims, 3 Drawing Figures

ROTARY VALVE FOR A POWER ASSISTED STEERING MECHANISM

This invention relates to rotary valves for power assisted steering mechanisms.

At the present time the most commonly used form of valve for use in power-assisted steering mechanisms for motor vehicles is a rotary valve having a generally cylindrical valve core mounted for oscillatory movement within a valve sleeve, the valve core and valve sleeve each being provided with a plurality of axially extending grooves therein which co-operate to control the flow of hydraulic fluid through the valve. Such a rotary valve is shown, for example, in United Kingdom patent specification No. 1308992. These known rotary valves are of the "open centre" kind wherein in the neutral or on-centre position of the valve hydraulic fluid under pressure from an engine driven pump simply flows through the valve and back to reservoir whereas then the valve core is angularly displaced from its on-centre position in one direction or the other hydraulic fluid will be directed to one side or the other of a double-acting piston-and-cylinder assembly or the like for providing power-assistance, the amount of power assistance provided being dependent upon the degree of angular movement of the valve core from its on-centre position. With these known open centre valves it is necessary that the pump supplying the hydraulic fluid under pressure be operating at all times that the vehicle is in use and whilst this has been accepted for light motor vehicles such as passenger cars and light commercial vehicles such as vans, it is not desirable and is wasteful of energy. On heavy commercial vehicles such as lorries and the like it is usual to obtain the hydraulic fluid under pressure for the power steering mechanism from a gas/hydraulic accumulator or like pressure source which is pressurised by an engine driven pump which is also usually used to pressurise other similar accumulators for servicing other functions on the vehicle such as the brakes, the engine driven pump only being operated intermittently when it is necessary to pressurise or re-pressurise an accumulator or accumulators. In these circumstances a closed centre valve is essential since otherwise it will not be possible to maintain pressure in the accumulator serving the power steering mechanism, the type of closed centre valve used normally being a spool valve. However, such spool valves are normally fairly complex, are difficult to manufacture and are expensive.

The present invention has as its object to provide a closed centre rotary valve suitable for use in power steering mechanisms, e.g., in power assisted rack-and-pinion steering mechanisms.

The present invention provides a closed centre rotary valve comprising co-operating relatively rotatable sleeve and core members having co-operating axially-extending grooves therein and means relatively biassing said members towards a neutral position, said grooves comprising at least one inlet groove connectable to a source of fluid under pressure, a cylinder groove angularly spaced from said inlet groove on either side thereof and connectable to opposite sides of double-acting piston-and-cylinder means, and a return groove in overlapping relation with each of said cylinder grooves in the neutral position of the valve and connectable to a reservoir for the fluid under pressure, said inlet groove being closed from communication with the cylinder and return grooves in the neutral position of the valve, the arrangement being such that on relative angular displacement of said members in one direction or the other from the neutral position the inlet groove will be placed in communication with one of said cylinder grooves, said one cylinder groove will be moved out of its overlapping relationship with its associated return groove to close communication therebetween and the overlap between the other cylinder groove and its associated return groove will be increased.

Said grooves may further comprise transfer grooves between the inlet groove and each of said cylinder grooves. According to a preferred embodiment of the invention stop means is provided for limiting the degree of relative angular movement between said members and two transfer grooves are provided between the inlet groove and each cylinder groove, said transfer grooves overlapping one another to such an extent that there will be communication therebetween in all relative angular positions of said members and one of said transfer grooves overlapping its adjacent cylinder groove in the neutral position of the valve, the inlet groove being provided in one of said members and being closed by a land of the other of said members in the neutral position of the valve. With the arrangement according to this preferred embodiment, when relative angular movement is effected between said members in one direction or the other the inlet groove will move into overlapping relation with a first one of said transfer grooves so as to open communication therebetween and allow fluid under pressure to pass from the inlet groove to said first transfer groove and then by way of the overlap between the transfer grooves into the second transfer groove from where it can pass into the adjacent cylinder groove since the overlap between said second transfer groove and said cylinder groove will have been increased by the relative angular movement whilst at the same time the overlap between that cylinder groove and its associated return groove will have been closed. At the same time communication between the inlet groove and the other cylinder groove will be maintained closed and the overlap between said other cylinder groove and its associated return groove will be increased to enable return fluid to flow more readily between said other cylinder groove and its associated return groove.

Said biassing means may be of any suitable or convenient form although according to a preferred embodiment of the present invention it comprises a torsion bar one end of which is secured to one of said members and the other end of which is secured to the other of said members.

To be effective for use in a power steering mechanism a closed centre valve must meet certain criteria. Firstly communication between the source of fluid under pressure and the cylinder and return grooves must be closed in the neutral position of the valve and this is achieved with the valve of the present invention. Secondly the two cylinder grooves must be in communication with their associated return grooves in the neutral position of the valve in order that the steering may return to the straight ahead condition of its own volition and again this is achieved in the valve of the present invention by virtue of the fact that the cylinder and return grooves are in overlapping relation in the neutral position of the valve. Thirdly when a steering movement is being effected and relative angular displacement takes place between the valve members the side of the double-acting piston-and-cylinder means not being pressurised must be allowed to exhaust if the steering movement is to be effected and this is achieved in the valve of the present invention by virtue of the fact that the overlap between the cylinder groove not being pressurised and its associated return groove is increased during the steering movement. Further the valve must work in both directions of steering movement and again this is achieved with the valve of the present invention. Finally the valve must "fail-safe" so that in the event, e.g., of a failure in the power steering system so that no fluid under pressure is provided to the valve, manual steering can be effected. This final requirement is achieved in the valve of the present invention by providing stop means which limits the amount of relative angular movement between the valve members and thus provides a mechanical connection therebetween which will provide manual steering once a predetermined degree of relative angular movement has been effected between the members.

In addition to the foregoing it is desirable that the valve should provide the "feel" which is necessary for optimum steering and this can be achieved by hydraulic reaction, e.g., by providing small reaction pistons which are exposed to the cylinder pressures on either side of the double-acting piston-and-cylinder means in a manner well known in the art. Alternatively, it may be possible to provide the required "feel" by suitably forming the edges of the said valve grooves, e.g., somewhat in the manner described in the aforesaid British Pat. No. 1308992, although this has not yet been tested.

The present invention further provides a power-assisted steering mechanism for a motor vehicle when provided with a closed centre rotary valve according to the present invention.

Figure 3:
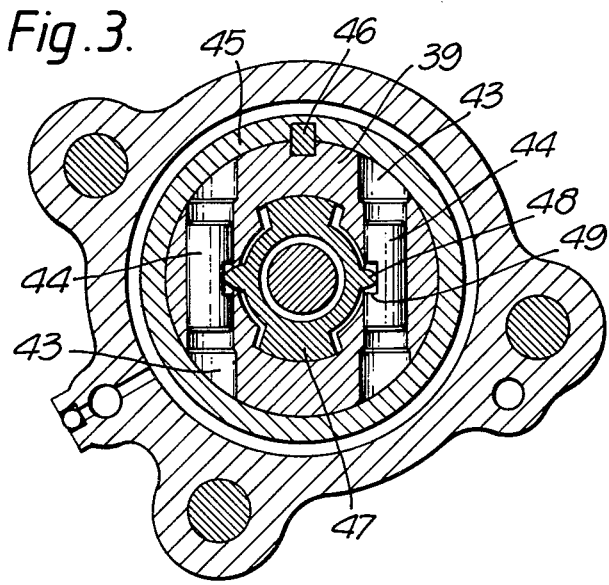
Figure 2:
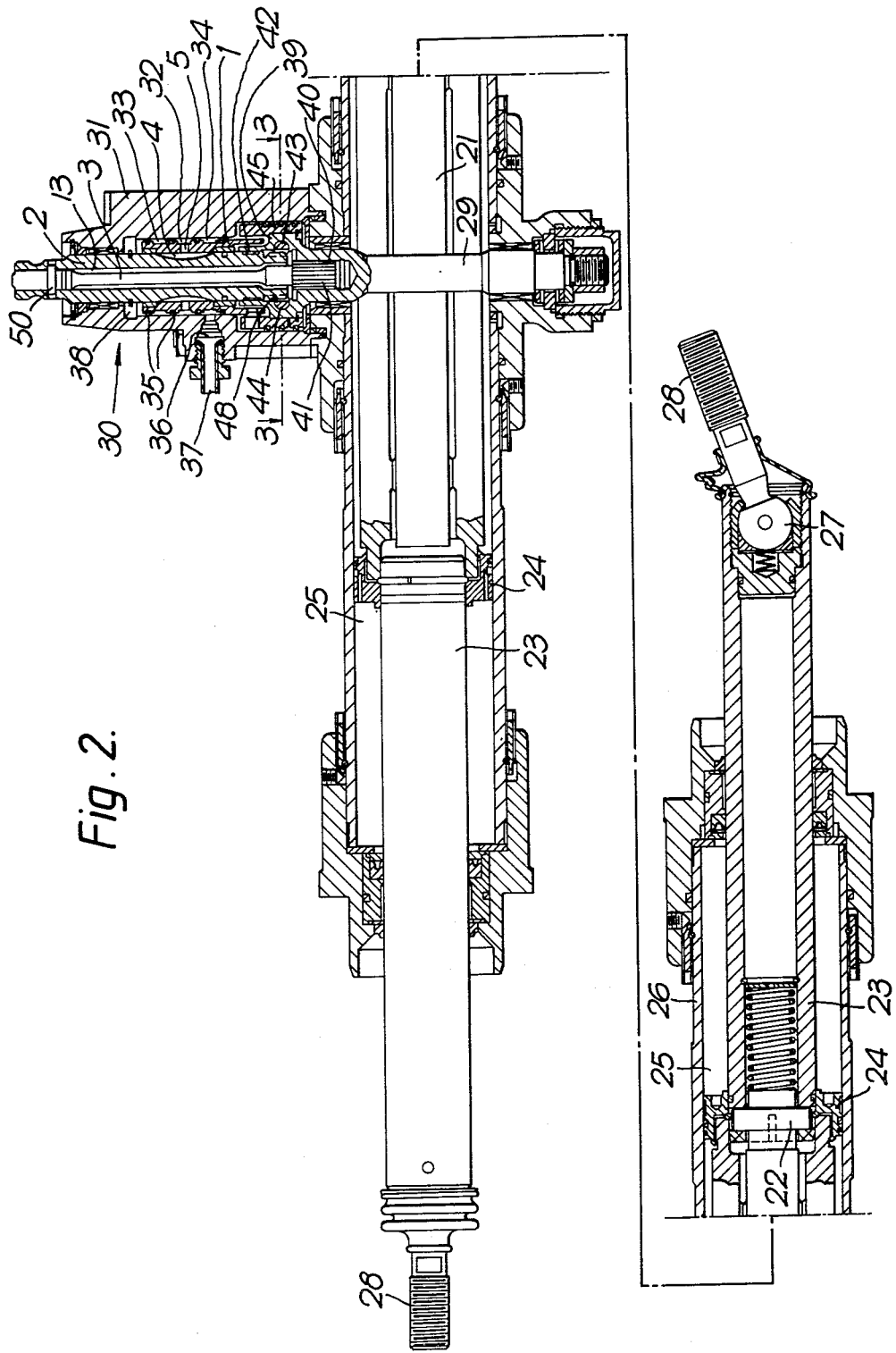

The present invention will be further described with reference to the accompanying drawings, in which:

FIG. 1 is a diagrammatic sectional view through the sleeve and core members of a closed centre rotary valve according to the present invention, FIG. 2 is a sectional elevation of a power-assisted rack-and-pinion steering mechanism according to the present invention, and FIG. 3 is a fragmentary cross-section on the line 3—3 of FIG. 2.

Referring to FIG. 1 it will be seen that the closed centre rotary valve illustrated therein comprises a cylindrical sleeve member 1 and a hollow cylindrical core or rotor member 2. The rotor member 2 is angularly displaceable relative to the sleeve member 1 in either direction and is biassed towards a centre or neutral position by means of a torsion bar 3. Suitable stop means (not shown), such as a lost-motion spline, limits the degree to which the rotor member can be angularly displaced relative to the sleeve member 1 in either direction. Equally spaced around the rotor member 2 are three axially extending inlet grooves 4 each of which is in communication with an inlet port 5 extending through a land 6 on the sleeve member 1, the inlet port 5 being connectable to a source of fluid under pressure (not shown) such as a gas/fluid accumulator. In the neutral position of the rotor member 2 shown in FIG. 1 the inlet grooves 4 are closed by the land 6. Equally spaced around the sleeve member 1 and extending axially thereof are three first cylinder grooves 7 each of which is connectable by way of a cylinder port 8 to one side of double-acting piston-and-cylinder means and three second cylinder grooves 9 each of which is connectable by way of a cylinder port 10 to the other side of double-acting piston-and-cylinder means. Also equally spaced about the rotor member 2 and extending axially thereof are three return grooves 11 each of which is connected by a return port 12 to the hollow centre 13 of the rotor 2. The hollow centre 13 of the rotor member 2 is connectable by way of suitable ports (not shown) to a reservoir for the fluid under pressure. The sleeve member 1 further has provided therein on either side of each land 6 and extending axially thereof a first transfer groove 14 each of which is in overlapping relation with an axially extending second transfer groove 15 in the rotor member 2 in the neutral position of the valve shown. Each second transfer groove 15 is also in overlapping relation with a cylinder groove 7 or 9 in the neutral position of the valve whilst each cylinder groove 7 or 9 is in overlapping relation with a return groove 11. In the neutral position of the valve the overlap between each first transfer groove 14 and its adjacent second transfer groove 15 is such that it creates a gap 17 between the edges of the grooves 14 and 15 which is greater than the degree of overlap 18 of each inlet groove 4 by a land 6. The degree of overlap between each second transfer groove 15 and its adjacent cylinder groove 7 or 9 in the neutral position of the valve is such as to produce a gap 19a or 19b respectively between the edges of the grooves which is smaller than the gap 17. Likewise the degree of overlap between each cylinder groove 7 or 9 and its adjacent return groove 11 in the neutral position of the valve is such as to produce a gap 20a or 20b respectively between the edges of the grooves which is again less than the gap 17. In addition the gaps 17 are greater than the maximum angular displacement of the rotor member 2. relative to the sleeve member 1 permitted by the stop means referred to hereinbefore. It will thus be seen that in the neutral position of the valve each of the inlet grooves 4 is closed by a land 6 whilst each of the cylinder grooves 7 and 9 is connected by a gap 20a or 20b to a return groove 11. When the rotor member 2 is angularly displaced in a clockwise direction then each of the inlet grooves 4 will move into overlapping relation with the first transfer groove 14 on the clockwise side thereof. At the same time each of the gaps 19a and 20b will be increased in size and each of the gaps 19b and 20a will close. Thus each of the cylinder grooves 7 will be placed in communication with the inlet groove 4 by way of a first cylinder groove 14, a gap 17, a transfer groove 15 and a gap 19a. At the same time each of the cylinder grooves 7 will be closed from communication with its adjacent return groove 11 and the communication between each of the second cylinder grooves 9 and its associated return groove 11 by way of a gap 20b will be increased. When the rotor member 2 is angularly displaced in an anticlockwise direction then the second cylinder grooves 9 will be placed in communication with the entry groove 4 by way of a transfer groove 14, a gap 17, a transfer groove 15 and a gap 19b. At the same time communication will be closed between each second cylinder groove 9 and its adjacent return groove 11 by closure of the gap 20b and communication between each of the first cylinder grooves 7 and their associated return grooves 11 will be increased by an increase in size of the gaps 20a. Thus it will be seen that when the valve is in the neutral position the inlet groove 4 will be closed and the cylinder grooves 7 and 9 will be connected to the return grooves 11 whilst when the rotor member 2 is angularly displaced in one direction or the other then either the cylinder grooves 7 or 9 will be placed in communication with the inlet groove 4 and will be cut off from communication with the return grooves 11 whilst at the same time the other of the cylinder grooves 7 or 9 will remain closed from the inlet groove 4 and will be placed in increased communication with the return grooves 11.

It will be understood that in FIG. 1 of the drawings the various ports 5, 8, 10 and 12 have for ease of illustration been shown as lying in the same plane but that in practice these ports will lie in different planes spaced axially of the valve members, the ports 5, 8 and 10 all communicating with axially spaced annular grooves provided in an outside surface of the valve sleeve 1 which annular grooves in turn communicate with ports provided in a housing of the rotary valve. Likewise the hollow centre 13 of the rotor member 2 communicates by way of a port or ports (not shown) with an annular passage defined between an end portion of the rotor member 2 and the housing of the valve, the housing having a return port therein which communicates with said annular space.

Referring now to FIG. 2 of the drawings it will be seen that the rack-and-pinion steering mechanism illustrated therein comprises a toothed rack 21 which is connected at each of its ends by a pivot pin 22 to a piston rod 23 each of which carries a piston 24 slidable in a cylinder 25 defined by a housing 26 of the rack-and-pinion steering mechanism. Each of the piston rods 23 is connected by way of a ball and socket joint 27 to a link 28 whereby the opposite ends of the rack-and-pinion rod assembly can be connected to the steerable road wheels of a vehicle. The toothed rack 21 is in meshing engagement with a pinion 29 which is connectable by way of a closed centre rotary valve generally indicated at 30 to the steering control of a motor vehicle. The rotary valve 30 is of the kind illustrated in FIG. 1 and comprises the valve sleeve member 1 and the rotor member 2 both of which are mounted in a housing 31. The pinion 29 is fixedly secured to the sleeve member 1 for rotary movement therewith and the rotor member 2 is connected to the pinion 29 and hence the valve sleeve 1, by way of the torsion bar 3. The sleeve member 1 and the housing 31 define therebetween a plurality of annular grooves 32, 33, 34 which are maintained isolated from one another by annular seals 35. The annular grooves 32 communicates an inlet port (not shown) in the housing 31 with the inlet grooves 4 by way of the inlet ports 5. The annular grooves 33 and 34 are respectively connected by way of the cylinder ports 8 and 10 to the cylinder grooves 7 and 9 (not shown in FIG. 2), the annular grooves 33, 34 being connected by way of cylinder ports 36 and conduits 37 (only one of which is shown) to opposite ends of the cylinder 25. The hollow interior 13 of the rotor member 2 is connected by way of one or more radial passages (not shown) to an annular space 38 defined between the rotor member 2 and the housing 31, the annular space 38 communicating with a return port (not shown) in the housing 31. At its upper end as shown in the aspect of FIG. 2 the pinion 29 is belled-out to form an enlarged end portion 39 having a splined bore 40 therein which receives a splined end 41 of the torsion bar 3 and a counterbore 42 which surrounds the lower end of the rotor member 2.

Referring to FIGS. 2 and 3 it will be seen that the enlarged end portion 39 of the pinion 29 defines cylinders 43 in which two small hydraulic reaction pistons 44 are mounted for sliding movement. The opposite ends of the pistons 44 are subjected to the pressures appertaining to the opposite ends of the cylinder 25 by way of suitable ports (not shown) and the distributor sleeve 45 surrounding the enlarged end portion 39 of the pinion 29 so as to provide the required "feel" at the steering control by hydraulic reaction when the steering control of the vehicle is operated to effect a steering movement. The distributor sleeve 45 is secured to the end portion 39 by means of a key 46 so as to move therewith. The rotor member 2 is connected to the pinion 29 by way of lost motion splines 47 (FIG. 3) so as to allow limited angular relative movement between the rotor member 2 and the pinion 29. Lugs 48 on the lower end of the rotor member 2 engage in recesses 49 in the pistons 44 whereby the hydraulic reaction on the pistons 44 is transmitted to the rotor member 2 and thus to the steering control of the motor vehicle. The torsion bar 3 is securely connected to the rotor member 2 by means of a cotter pin 50 mounted in aligned bores in the rotor member 2 and torsion bar 3.

In the embodiment of the invention illustrated in FIG. 1, the valve has been shown as having three inlet grooves 4, three cylinder grooves 7, three cylinder grooves 10 and three return grooves 11 all of which are equally spaced about the sleeve member 1 and rotary member 2, this arrangement being preferred because it gives a hydraulically balanced valve. It will be understood, however, that it is not necessary to provide three of each of these grooves since only a single inlet groove 4, a single cylinder groove 7, a single cylinder groove 9 and a single return groove 11 are necessary for operation of the valve, although if only one of each of these grooves is provided other means will be desirable or necessary to hydraulically balance the valve. The only limitations on the maximum number of each of these grooves which are provided is the limitation imposed by size and space.

I claim:

1. A closed centre rotary valve comprising cooperating relatively rotatable sleeve and core members having cooperating axially-extending grooves therein and means relatively biasing said members towards a neutral position, said grooves comprising at least one inlet groove connectable to a source of fluid under pressure, a cylinder groove angularly spaced from said inlet groove on each side thereof and connectable to opposite sides of double-acting piston-and-cylinder means, and a return groove in overlapping relation with each of said cylinder grooves in the neutral position of the valve and connectable to a reservoir for the fluid under pressure, said inlet groove being closed from communication with the cylinder and return grooves in the neutral position of the valve, the arrangement being such that on relative angular displacement of said members in either direction from the neutral position the inlet groove will be placed in communication with one of said cylinder grooves, said one cylinder groove and its associated return groove will move out of their overlapping relation to close communication therebetween, and the overlap between the other cylinder groove and its associated return groove will be increased.

2. A rotary valve according to claim 1, wherein said grooves further comprise transfer grooves between the inlet groove and said cylinder grooves.

3. A closed centre rotary valve comprising cooperating relatively rotatable sleeve and core members having cooperating axially-extending grooves therein and means relatively biasing said members towards a neutral position, said grooves comprising at least one inlet groove connectable to a source of fluid under pressure, a first cylinder groove angularly spaced from said inlet groove on one side thereof and a second cylinder groove angularly spaced from said inlet groove on the other side thereof, said first and second cylinder grooves being connectable to opposite sides of double-acting piston-and-cylinder means, a pair of transfer grooves between the inlet groove and each of said first and second cylinder grooves, and a return groove in overlapping relation with each of said first and second cylinder grooves in the neutral position of the valve and connectable to a reservoir for the fluid under pressure, said inlet groove being closed from communication with the cylinder and return grooves in the neutral position of the valve, the arrangement being such that on relative angular displacement of said members in either direction from the neutral position the inlet groove will be placed in communication with one of said first and second cylinder grooves, said one cylinder groove and its associated return groove will move out of their overlapping relation to close communication therebetween, and the overlap between the other of said first and second cylinder grooves and its associated return groove will be increased.

4. A rotary valve according to claim 3, wherein stop means is provided for limiting the degree of relative angular movement between said members, the transfer grooves of each said pair overlap to such an extent that there is communication therebetween in all relative angular positions of said members, and one of said transfer grooves of each pair of overlaps its adjacent cylinder groove in the neutral position of the valve.

5. A rotary valve according to claim 3, wherein the inlet groove is provided in one of said members and is closed by a land of the other of said members in the neutral position of the valve.

6. A rotary valve according to claim 3, wherein said biassing means comprises a torsion bar one end of which is secured to one of said members and the other end of which is connected to the other of said members.

7. A rotary valve according to claim 3, wherein the inlet groove, return grooves and one of each pair of transfer grooves are in the core member, the cylinder grooves and the other of each pair of transfer grooves are in the sleeve member, the inlet groove is closed by a land of the sleeve member in the neutral position of the valve, and a core member has a hollow centre which is connectable to a said reservoir for the fluid under pressure and which is connected to the return grooves by radial passages in the core member.

8. A rotary valve according to claim 3, wherein a plurality of inlet grooves are provided each with its associated first and second cylinder grooves, transfer grooves and return grooves, each return groove, in the neutral position of the members being in overlapping relation with a first cylinder groove associated with a first inlet groove and a second cylinder groove associated with a second inlet groove whereby on relative angular displacement of said members communication will be closed between each return groove and one of said first and second cylinder grooves and communication will be increased between each return groove and the other of said first and second cylinder grooves.

9. A rotary valve according to claim 3, wherein the core member is rotatable relative to the sleeve member and that hydraulic reaction pistons slidable in cylinders the opposite ends of which can be subjected to the cylinder pressures on either side of a said double-acting piston-and-cylinder means are operatively connected to the core member for providing a hydraulic reaction to rotary movement of the core member.

10. A power-assisted rack-and-pinion steering mechanism for a motor vehicle, comprising a toothed rack, a pinion in meshing engagement with the toothed rack for imparting longitudinal movement to the toothed rack, at least one end of the toothed rack being connectable to the steerable road wheels of a vehicle to impart steering thereto, double-acting piston-and-cylinder means operatively associated with the toothed rack and a closed centre rotary valve for directing fluid under pressure from a source thereof to one side or the other of said double-acting piston-and-cylinder means, said pinion being connectable to the steering control of a motor vehicle by way of said rotary valve, said rotary valve comprising cooperating relatively rotatable sleeve and core members having cooperating axially-extending grooves therein and means relatively biassing said members towards a neutral position, said grooves comprising at least one inlet groove connectable to said source of fluid under pressure, a cylinder groove angularly spaced from said inlet groove on each side thereof and connectable to opposite sides of said double-acting piston-and-cylinder means, and a return groove in overlapping relation with each of said cylinder grooves in the neutral position of the valve and connectable to a reservoir for the fluid under pressure, said inlet groove being closed from communication with the cylinder and return grooves in the neutral position of the valve, the arrangement being such that on relative angular displacement of said members in either direction from the neutral position the inlet groove will be placed in communication with one of said cylinder grooves, said one cylinder groove and its associated return groove will move out of their overlapping relation to close communication therebetween, and the overlap between the other cylinder groove and its associated return groove will be increased.

* * * * *